United States Patent [19]

Kawamura et al.

[11] Patent Number: 5,649,212
[45] Date of Patent: Jul. 15, 1997

[54] INFORMATION PROCESSING SYSTEM HAVING A FLOPPY DISK DRIVE WITH DISK PROTECTION DURING A RESUME MODE

[75] Inventors: Tateo Kawamura, Sagamihara; Susumu Shimotono, Hadano, both of Japan

[73] Assignee: International Business Machines Corporation, Armonk, N.Y.

[21] Appl. No.: 584,994

[22] Filed: Jan. 11, 1996

Related U.S. Application Data

[63] Continuation of Ser. No. 279,970, Jul. 25, 1994, abandoned.

[30] Foreign Application Priority Data

Jul. 26, 1993 [JP] Japan ............................. 5-184169

[51] Int. Cl.⁶ ................................................ G06F 13/00
[52] U.S. Cl. ..................... 395/750; 395/839; 395/481; 395/618; 395/621
[58] Field of Search ............................... 395/750, 621, 395/481, 618, 839

[56] References Cited

U.S. PATENT DOCUMENTS

| | | | |
|---|---|---|---|
| 4,920,370 | 4/1990 | Taniguchi et al. | 354/402 |
| 5,287,503 | 2/1994 | Narad | 395/425 |
| 5,305,180 | 4/1994 | Mitchell et al. | 361/685 |
| 5,339,437 | 8/1994 | Yuen | 395/700 |
| 5,339,444 | 8/1994 | Nakajima | 395/750 |
| 5,369,771 | 11/1994 | Gettel | 395/750 |
| 5,446,904 | 8/1995 | Belt et al. | 395/750 |

*Primary Examiner*—Glenn A. Auve
*Assistant Examiner*—John Travis
*Attorney, Agent, or Firm*—Martin McKinley; Brian F. Russell; Andrew J. Dillon

[57] ABSTRACT

Data destruction resulting from the conversion of a floppy disk can be prevented during a low-power consumption mode in which the FDD is powered off. The present invention is also designed to prevent data destruction resulting from the conversion of a floppy disk during a low-power consumption mode in which an FDC and an FDD are stopped. In the process of returning to a normal operation mode, an I/O address showing a change line status register of the FDC is set to a stored register of the trap logic (status 173). When the process returns to the normal operation mode and an access to the first status register is trapped, a change line status flag value is rewritten (status 174). The faked OS/driver invalidates the floppy disk allocation information in the main memory.

7 Claims, 16 Drawing Sheets

```
MOV   DX, 3F7H
IN    AL, DX  → Trap
TEST  AL, 80H ←
```

INFORMATION PROCESSING SYSTEM HAVING A FLOPPY DISK DRIVE WITH DISK PROTECTION DURING A RESUME MODE

This is a continuation of application Ser. 08/279,970, filed Jul. 25, 1994 now abandoned.

BACKGROUND OF THE INVENTION

1. Technical Field

The present invention relates to information processing systems that operate with a low power consumption, and more particularly to a portable information processing system such as a notebook computer.

2. Description of the Related Art

As a result of the recent technological innovation, small-size and lightweight portable computers have become common. When such portable computers are used outdoors, electric power is supplied to them with batteries. However batteries mounted on portable computers are restricted to small-size batteries. Thus the amount of operation time of personal computers with one charge of the batteries is short. Consequently, various kinds of devices are provided for reducing the consumption of power in many portable computers.

A suspend/resume function is one of such devices. When the suspend/resume function operates, the computer enters into a suspend mode in response to a situation such as one in which the activity of an I/O device is not detected for a certain time. In the suspend mode all tasks are suspended and the main memory saves data which will be required later for resuming the tasks. In the suspend mode the main memory and the video memory (VRAM) are powered on, but the CPU or the like are powered off. However, portable computers have a drawback in that the power of batteries is consumed when the suspend mode continues for a long time with only the support of the suspend/resume function, resulting in the contents of the memory and the VRAM being erased.

Therefore, portable computers which are supported with a hibernation mode, such as the LTE Lite/25 manufactured by Compaq Company (Compaq and LTE are registered trademarks of Compaq Computer Corporation), have been proposed and marketed. When the hibernation mode is enabled, the computer enters a low battery state. Otherwise, when the suspend mode continues for a certain time, the computers enter hibernation mode after saving all the data required for resuming the task later onto the hard disk. In hibernation mode, the whole system, including the memory and the VRAM, is powered-off. When users power-on the system later, the data stored in the hard disk is restored in the memory and the VRAM and the tasks which had been suspended are automatically resumed. The series of operations accompanying power-on are also referred to as wake-up.

Conventional information systems have a drawback in that if a floppy disk drive (FDD) is resumed or woken-up and powered-on after a floppy disk has been exchanged during a suspend or hibernation mode in which a floppy disk controller (FDC) and the FDD are powered off, the FDD accesses the new floppy disk using the file allocation information in the old floppy disk, thereby destroying the data on the new floppy disk.

SUMMARY OF THE INVENTION

The present invention has been made in view of the above problem. The object of the present invention is to prevent the destruction of data due to the conversion of a floppy disk during a low-power consumption mode in which the FDC and the FDD are powered-off.

The foregoing object is achieved as is now described. To attain the above object, the present invention provides an information processing system including a CPU, a main memory, a floppy disk controller (FDC) and a floppy disk drive (FDD). A change line is provided between the FDC and the FDD for monitoring the attachment/detachment of a floppy disk to/from the FDC. The status of the change line is reflected by a flag value in the status register in the FDC, the flag status being used to determine the validity of the file allocation information that has been stored via the FDC to the main memory. The information processing system includes: a means for entering a low power-consumption mode by turning off the power to the FDC and FDD upon the occurrence of a first predetermined condition, a means for entering a normal operation mode, during which the FDC and the FDD are powered-on, upon the occurrence of a second predetermined condition, and a means for taking the flag status at the first access after the transition from the low-power consumption mode to the normal operation mode.

The means for taking the flag status from the low-power consumption mode to the normal operation mode may include: a trap logic for monitoring access to an I/O address set in a stored register, a means for setting an I/O address showing the status register in the trap logic register, a means for rewriting the flag value when the access to first status register is trapped by the trap logic upon return to the normal operation mode, and a means for clearing the register of the trap logic so that the access to the status register after the second time is not trapped.

Or, alternatively, the means may include: a register to which a specific I/O address is allocated, a logic gate means in which one input is connected to the change line, another input is connected to a specific bit of the register in the specific I/O address, and the output is supplied to the status flag, a means for setting in the process of a series of processes for returning to the above normal operation mode a value in a register of the above specific I/O address so that a value showing that the above file allocation information is invalid can be set to the above flag, and a means for clearing a register of the above specific I/O address in response to the above status register.

The above, as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

A. Construction of the System as a Whole

Figure 1:
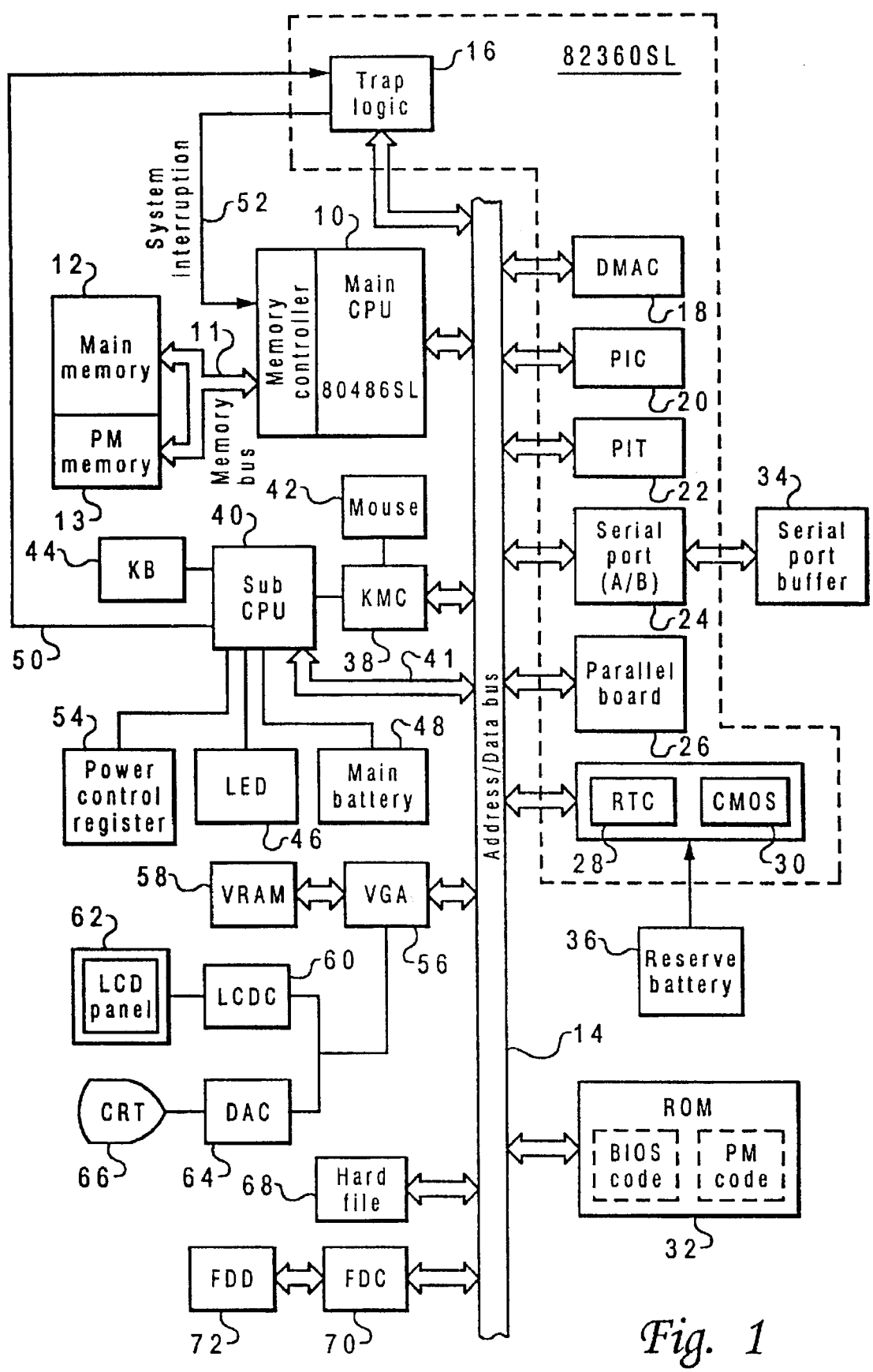
FIG. 1 is a view illustrating a hardware construction element in one embodiment of an information system using the present invention.

FIG. 1 shows, in a simplified form, the structural elements of the main hardware in a notebook-type computer (simply referred to hereinafter as the system) embodying the present invention. Reference Numeral 10 designates a main CPU, for example, Intel's 80486SL which incorporates a memory controller. The CPU 10 communicates with a main memory 12 and a PM memory 13 via a memory path 11. The main memory 12 loads a BIOS, a driver, an OS, and an application. On the other hand, a PM memory 13 stores a PM code (PMC) performing power management including the hibernation mode and the work data thereof. The PM memory is further separated into an area where the PMC is stored and an area where the work data is stored. The PMC is loaded from ROM at the time of POR (power-on/reset).

It is possible to allocate different chips to the PM memory and the main memory, for example, SRAM chips as the PM memory and DRAMs as the main memory. The preferred embodiment uses the architecture of the 80486SL to allocate a specific area of each DRAM chip to the main memory 12 and the PM memory 13.

The PMC can access both the main memory 12 and the PM memory 13. On the other hand, the OS and the driver cannot access the PM memory 13. The memory controller can switch the communication of the CPU 10 so that the CPU 10 communicates either with the main memory 12 or with the PM memory 13.

The CPU 10 connects with a trap logic 16, a DMAC (direct memory access controller) 18, a PIC (programmable interruption controller) 20, a PIT (programmable interval timer) 22, a serial port 24, a parallel port 26, an RTC (real time clock) 28, a CMOS 30, and a ROM 32 via an address/data bus 14.

The output terminal of the trap logic 16 is connected with a specific pin of the CPU 10 by a system interruption line 52. The trap logic 16 constantly monitors a bus 14. When the trap logic 16 detects an access to an address set in the stored register, the system interruption line 52 is rendered active. The trap logic 16 also activates the system interruption line 52 when a signal 50, inputted to an external input terminal, is rendered active.

The embodiment uses Intel's I/O chip set 82360SL, which is a collection of the trap logic 16, the DMAC 18, the PIC 20, the PIT 22, the serial port 24, the RTC 28, and the CMOS 30. In the 82360SL, the system interruption is referred to as an SMI (system management interrupt). When the SMI occurs, the memory controller enables communication between the CPU 10 and the PM memory 13 thereby initiating execution of the PMC which serves as an SMI handler. The SMI handler (PMC) detects the cause of the SMI jumping to a processing routine in accordance with the cause.

The serial port 24 is connected with one or more I/O devices via a serial port buffer 34. These I/O devices can voluntarily set either to a base address of I/O space allocated to the port 24 (for example, 3F8 (H) or 2F8 (H)).

The RTC 28 and the CMOS 30 are mounted on one chip. A reserve battery 36 powers-on the chip even when the system is powered-off. The reserve battery 36 can be a coin battery.

The ROM 32 stores PMC in addition to BIOS code. The POST (power-on self-test) which runs at the time of POR of the system loads the PMC from ROM 32 to the PM memory 13.

The CPU 10 receives a signal from a mouse 42 and a keyboard 44 via a KMC (keyboard/mouse controller) 38. In this embodiment, a processor (sub-CPU 40) which monitors a matrix of the keyboard 44 also serves as part of the power management function. The sub-CPU 40 monitors a matrix comprising the keyboard 44, a lid 46, and a main battery 48. When the sub-CPU 40 detects that a predetermined situation has occurred (for example, a hot key has been pressed, the lid is closed, or the main battery 48 is in a low battery condition), a signal line 50 is rendered active. The sub-CPU 40 is connected with the address data bus 14 via a bus 41. Thus, the sub-CPU exchanges instructions and data concerning power management (including hibernation) with the main CPU 10 via the bus 41.

The sub-CPU 40 outputs a signal to the power control register 54 instructing that each device is to be powered-off or the whole system is to be powered-off. Details thereof will be given later with respect to FIG. 2.

The CPU 10 connects with a VGA chip 56 via a bus 14. The VGA chip 56 is a display controller, which controls an LCD panel 62 through an LCDC (LCD controller) 60 so that information is displayed in accordance with the content of the VRAM 58. Alternatively, it is possible to mount a display unit, including a CRT (cathode ray terminal) 66 and a DAC (digital analog converter) 64, as an option on the system. In such case, the VGA chip 56 controls the display of information on the CRT 66.

The system mounts a hard disk device 68 and an FDC (floppy disk controller) 70/FDD (floppy disk drive) 72 as external storage device. The hard disk device 68 includes a hard disk drive and a hard disk mounted within the hard disk drive. The hard disk device 68 will be referred to as a hard file hereinafter. When the system enters into hibernation mode, a file (hibernation file) for storing data is prepared on the hard file. In accordance with the present invention, the hibernation/wake-up can be supported even when the hard file is removable.

In addition to the above hardware elements, there are provided many I/F's (interfaces) on the system (for example, a bus transceiver is provided between the hard file 68 and the bus 14). Such elements are already known to those skilled in the art. They are not shown in the drawings for simplicity.

Figure 2:
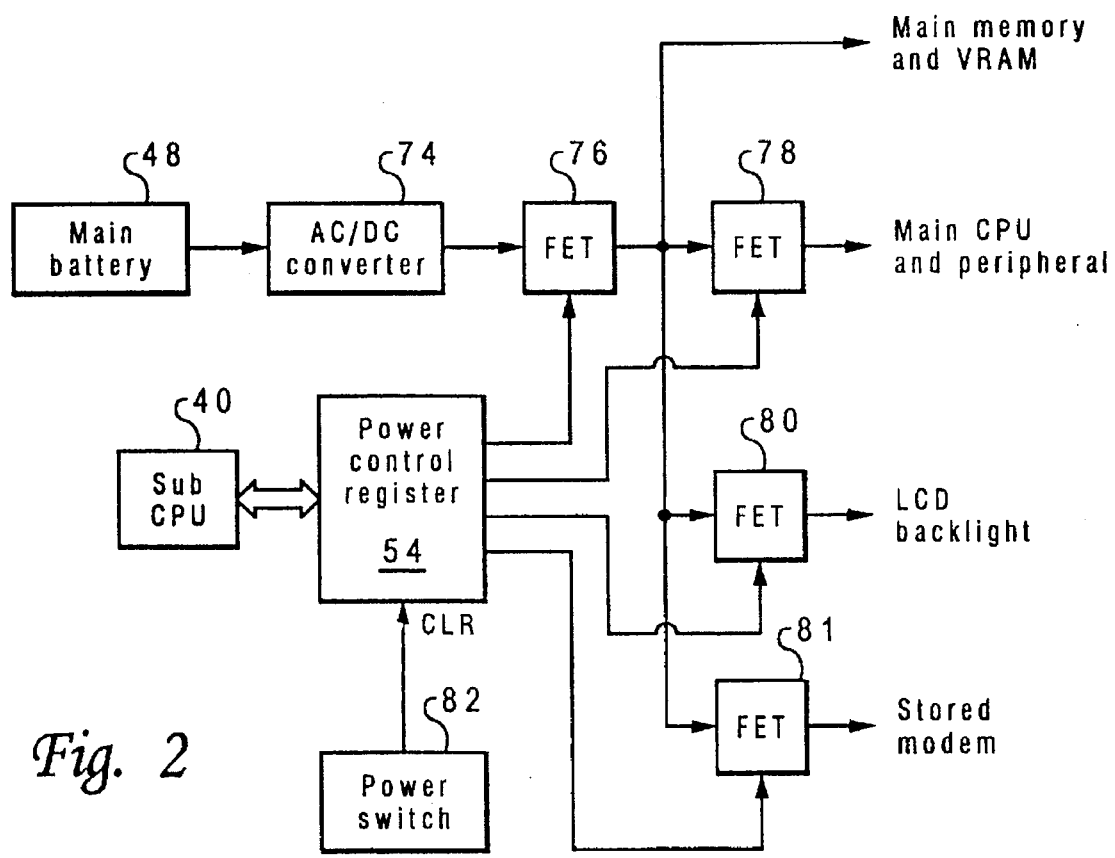
FIG. 2 is a view illustrating a hardware construction element.

Next, a power-on/off mechanism will be explained with respect to FIG. 2. The output of a main battery 48 is inputted into an FET switch 76 which can power-off the whole system at one time. The output of the FET switch 76 is supplied directly to the main memory and the VRAM. In addition, the output of the FET switch 76 is supplied to an input terminal of LCD backlight power via an FET switch 80, to an integrated modem directly connected to the serial port 24 via an FET switch 81, and to the main CPU 10 and other peripherals via an FET switch 78.

Each of these FET switches is electrically connected with a bit cell which corresponds to a power control register 54. Thus, a value the sub-CPU 40 sets to the register 54 controls the power-on/off of FET switches 76, 78, 80, and 81. When the system enters hibernation mode, the sub-CPU 40, upon receipt of the PMC instruction, sets a value for powering-off the FET 76 to a corresponding bit, thereby powering-off the whole system, including the main memory and the VRAM. When the system enters a suspend mode, the sub-CPU 40, upon receipt of the PMC instruction, powers on the FET switch 76, and sets a value for powering-off FET switches 78, 80, 81 in the register 54, thereby powering-off the system except for the main memory and the VRAM.

The clear terminal of the power control register 54 is electrically connected to a power switch 82 of the system. Thus, a signal generated when users power-on the system, resets the value of the register 54, thereby switching-on all the FET switches and powering-on the whole system.

B. Construction of the Hibernation File

Figure 3:
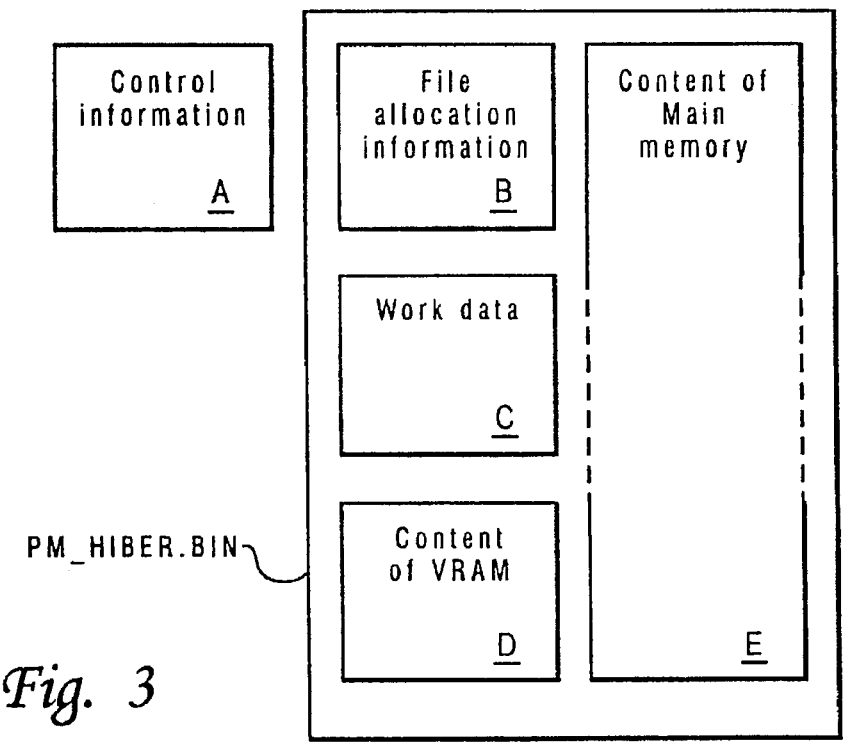
FIG. 3 is a view illustrating a construction of a hibernation file.

As shown in FIG. 3, the embodiment secures a location on the hard disk for a block A for the control information, a block B for the file allocation information, a block C for work data in the PM memory, a block D for the content of the VRAM, and a block E for the content of the main memory. As will be detailed later, the control information is required immediately after the system is powered-on. Such information includes system configuration information and respective start addresses for blocks B through D. Work data is other data required for hibernation. Work data includes hardware context information (described later) and different control flags. One example of a control flag is a flag whose value can be converted by users for selecting whether the system beeps or not upon entering or exiting the hibernation mode.

Blocks A through E may be a series of areas physically connected into one integration. However, the block A is at least required to reside in a fixed place on the disk. Thus, in the embodiment, only block A is arranged at the head of a CE cylinder (which is reserved but cannot be accessed by users) that is defined on the innermost part of the hard disk. Thus, the location is fixed and the control information can be stored from a sector in the middle of the CE cylinder.

As will be detailed in section C, blocks B through E are a place where an OS file system is used to secure a place for one file in the user partition of a hard disk in the same dimension as the user file. File names are reserved, and they are given the name PM_HIBER.BIN in this embodiment. Blocks B through E can be extended in length. When the hibernation file actually stores data, the start addresses for blocks C through E are determined. Sectors constituting blocks B through E normally reside physically on the hard disk in a scattering manner. Sector connection information is recorded on a hard disk in the form of a list in the file allocation information area (FAT (file allocation table) when DOS is used as the OS). As will be detailed in section D, the PMC converts sector connection information, constituting PM_HIBER.BIN, into unique allocation information and stores the converted information in the block B.

C. Generation of A Hibernation File

Figure 5:
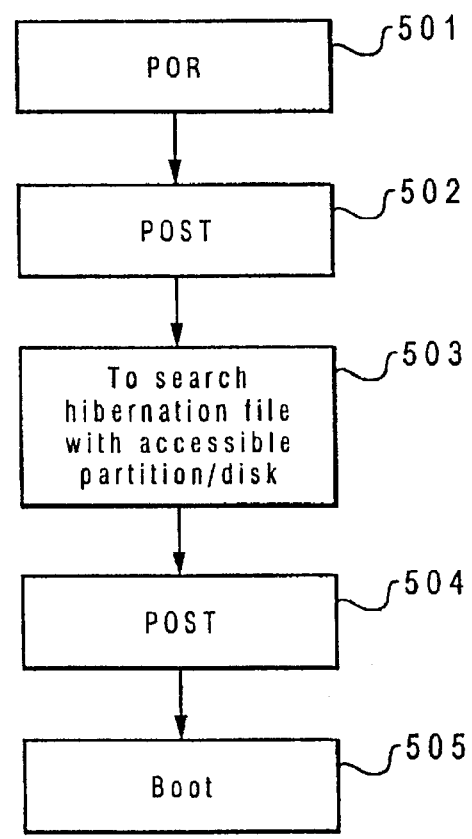
FIG. 5 is a flowchart showing steps executing POST (Power-On Self-Test)
Figure 4:
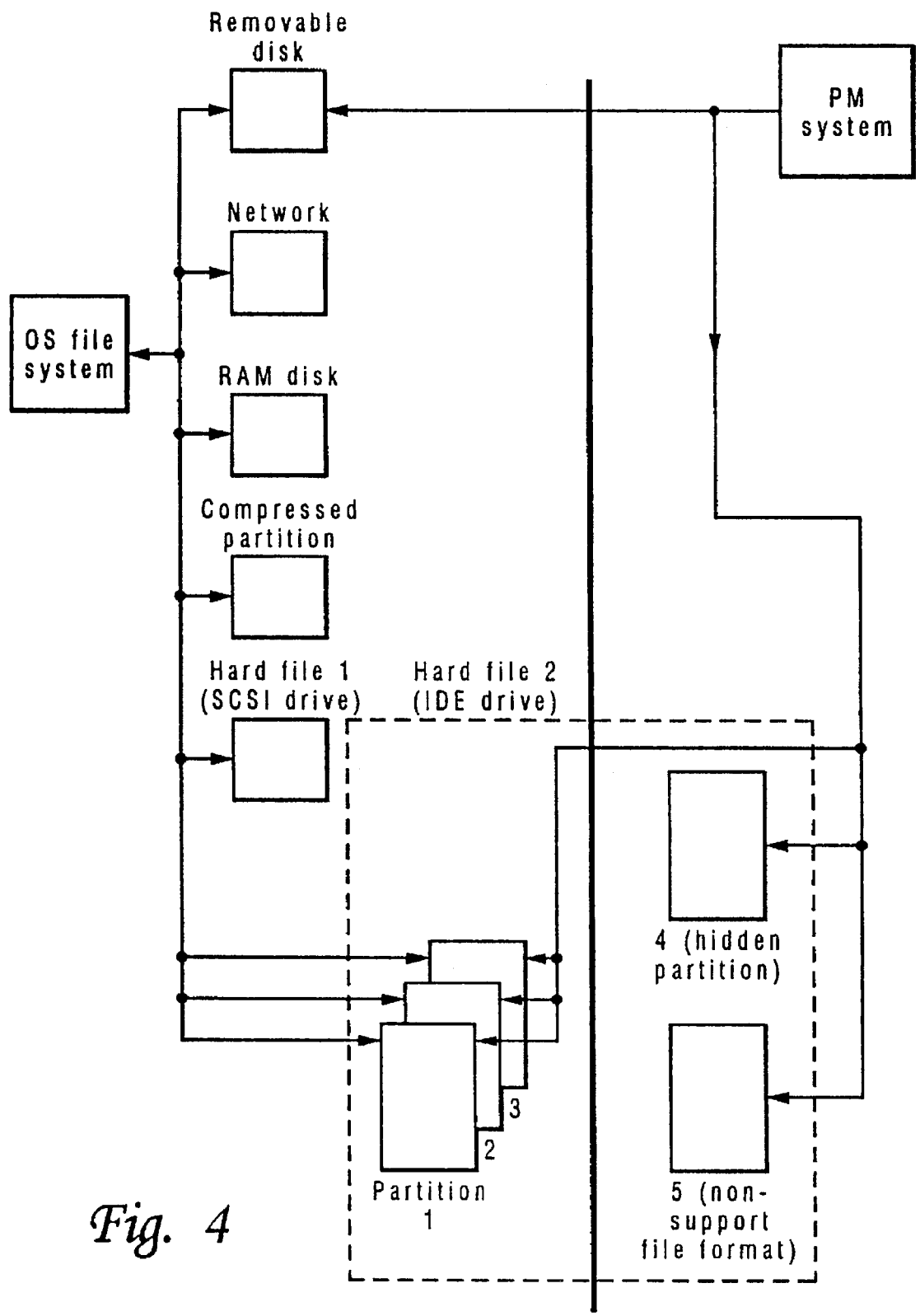
FIG. 4 is a view illustrating a drive accessible by the OS (Operating System) file system or the PM (Power Manager) code.
Figure 6:
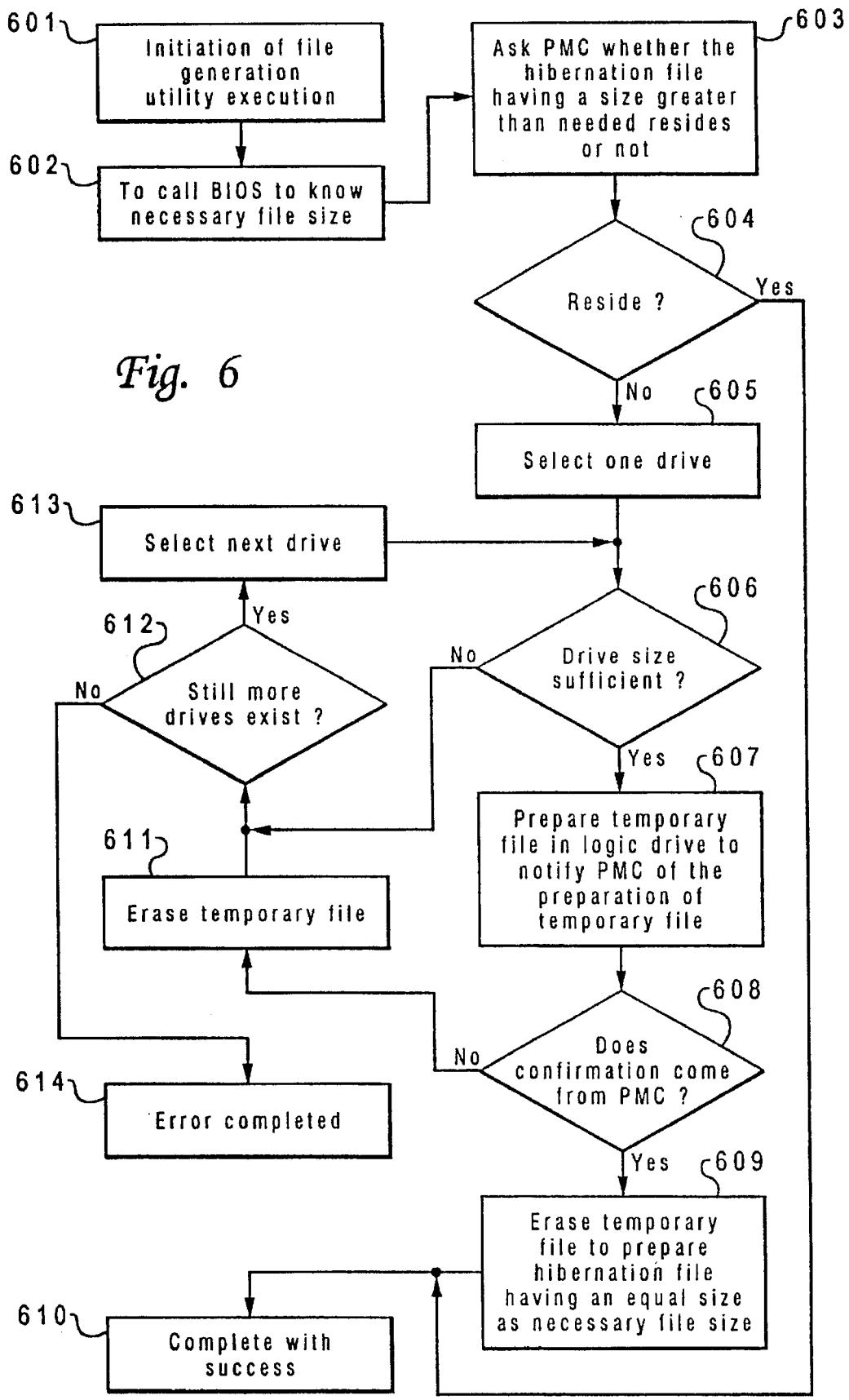
FIG. 6 is a flowchart showing operation procedures of the file preparation utility.

The generation of a hibernation file in accordance with the present invention will be detailed with respect to FIG. 4 through FIG. 6.

In accordance with the present invention, the OS file system is used to provide a hibernation file in the user partition of a block device such as a hard file or the like. For this purpose a file preparation utility (for example, an executable program (.EXE file)) is prepared for making a hibernation file. A plurality of block devices are available, but the PMC cannot necessarily access all the devices directly (without passing through the driver/BIOS managed by the OS system file). This is because the PMC cannot directly access some devices because the I/F (hardware) which seems to be the same drive PMC logically from the utility is not appropriate.

In the embodiment shown in FIG. 4, the OS file system can access a removable disk (for example, an optical disk, SSF (solid state file), an SRAM card and the like), a network drive (a remote file), a RAM disk, a compression partition, a hard file 1 serving as an SCSI drive, and partitions 1, 2, and 3 of a hard file 2 serving as an IDE drive. These are identical logic drives for the utility. These drives are explained hereunder.

At the outset, the network drive is a drive for a different system connected via a network. The PMC cannot access the network drive to transfer data for hibernation/wake-up. A RAM disk is an imaginary drive and no I/F is prepared that the PMC can access (since the RAM disk is volatile by nature, the disk cannot hold data during hibernation mode).

The compression partition is a drive for storing compressed data. In the compression partition a corresponding drive, having a specific algorithm, compresses data to be written in the drive or extends data to be read. The PMC cannot use the compression/extension algorithm because a driver corresponding to the compression partition can operate under the management of the OS file system. Consequently, the compression partition is inappropriate for preparing the hibernation file. In addition, when only the IDE drive is prepared as the I/F for the hard file, which the PMC can directly access, the PMC cannot access the hard file 1.

The partition 4 prepared on the hard file is a hidden partition. In addition, the partition 5 is a drive having a format which is not supported on the OS file system. When DOS is used in the OS file system, the HPFS (high performance file system) format of OS/2 is not supported (OS/2 is a registered trademark of International Business Machines Inc). Even when the PMC can access partitions 4 and 5, the OS file system cannot access partitions 4 and 5.

Some of these drives turn out to be inappropriate for preparing a hibernation rile when the utility refers to the OS file system. In the embodiment shown in FIG. 4, the network drive is one such drive. However, for the utility, it is not clear as to whether the PMC can access other drives.

It is conceivable that a drive letter allocated to the drive may allow the utility to specify a hibernation file preparation file. However, the drive letter is different depending on an order in which a driver supporting a drive is installed. In addition, when there are a plurality of drives which can be booted, the utility cannot specify the drive in a fixed manner by using a drive letter, and the PMC doesn't know a correlative relation between the drive and the drive letter.

The present invention identifies, in the following manner, a drive that the PMC can access and is suitable in preparing a hibernation file for the utility.

At the outset, the operation of the system at the time of the POR will be detailed with respect to FIG. 5. When the power switch is turned on or when the system is reset, the POST program runs (step 502). When the POST completes loading the PMC in the PM memory, the PMC is executed temporarily. Each drive the PMC can access searches the hibernation file (PM_HIBER.BIN) (step 503). After the search is completed, the POST is executed again, thereby entering the procedure for a normal boot or a boot for wake-up (step 504, 505).

Next, a step executed by the hibernation file preparation utility will be described with respect to FIG. 6. When the hibernation file is enabled by users who input a command or give an instruction via a graphical user interface, the file preparation utility begins (step 601). In step 602, the utility calls BIOS to determine the size required for the hibernation file (total size of the main memory, the work data area of the PM memory and the VRAM).

In step 603, the PMC determines whether the search at step 503 has detected that the hibernation file (PM_HIBER.BIN) has a size greater than needed. If such a file resides, the file can be used for storing data and the process after that is stopped.

When the response of the PMC is negative, the following steps will be executed with respect to each drive the utility can access, except for the drives which are inappropriate, like the network drive, by referring to the OS file system.

At the outset, it is determined whether or not the size of the selected drive is greater than that required for the hibernation file (step 606). If the result of the judgment is affirmative, the OS file system is utilized to temporarily prepare a small file to reserve a name in the drive, thereby notifying the PMC that the file is temporarily prepared (step 607). The name of the temporary file may be PM_HIBER.BIN or another name. The size of the file preparing it may be 0 (zero).

Once the PMC has been notified of the temporary file, it immediately attempts to read the temporary file. When the PMC has succeeded, it sends a confirmation to the utility. When the drive receives the confirmation from the PMC, the PMC can access the drive. The size of the PMC is also sufficient. Consequently, the utility erases the temporary file. After that, a hibernation file having the same size as the above necessary file and a name of PM_HIBER.BIN is prepared on the drive by using the OS file system (step 609).

When the PMC does not send the confirmation that the file has been read, the temporary file is erased (step 611). Then steps 606, 607, and 608 are repeated with respect to the selected files. When the drive size is insufficient, steps 607, 608, and 611 are skipped. When the PMC does not send the confirmation with respect to any drive, the system notifies users that the hibernation cannot be executed (e.g. sounding a beep or displaying a message) and the operation series is finished (step 614).

In the above embodiment, a drive appropriate for preparing a file is detected and a hibernation file is immediately prepared. As a modification of this embodiment, after checking whether or not the preparation of the hibernation file is appropriate with respect to the all the logic drives, a drive appropriate to the user may be proposed. In such a case, the user is prompted with the proposed drive appropriate to prepare a hibernation file. The file is established on the drive selected by the user.

D. Outline of Store/Restore Sequence

Figure 7:
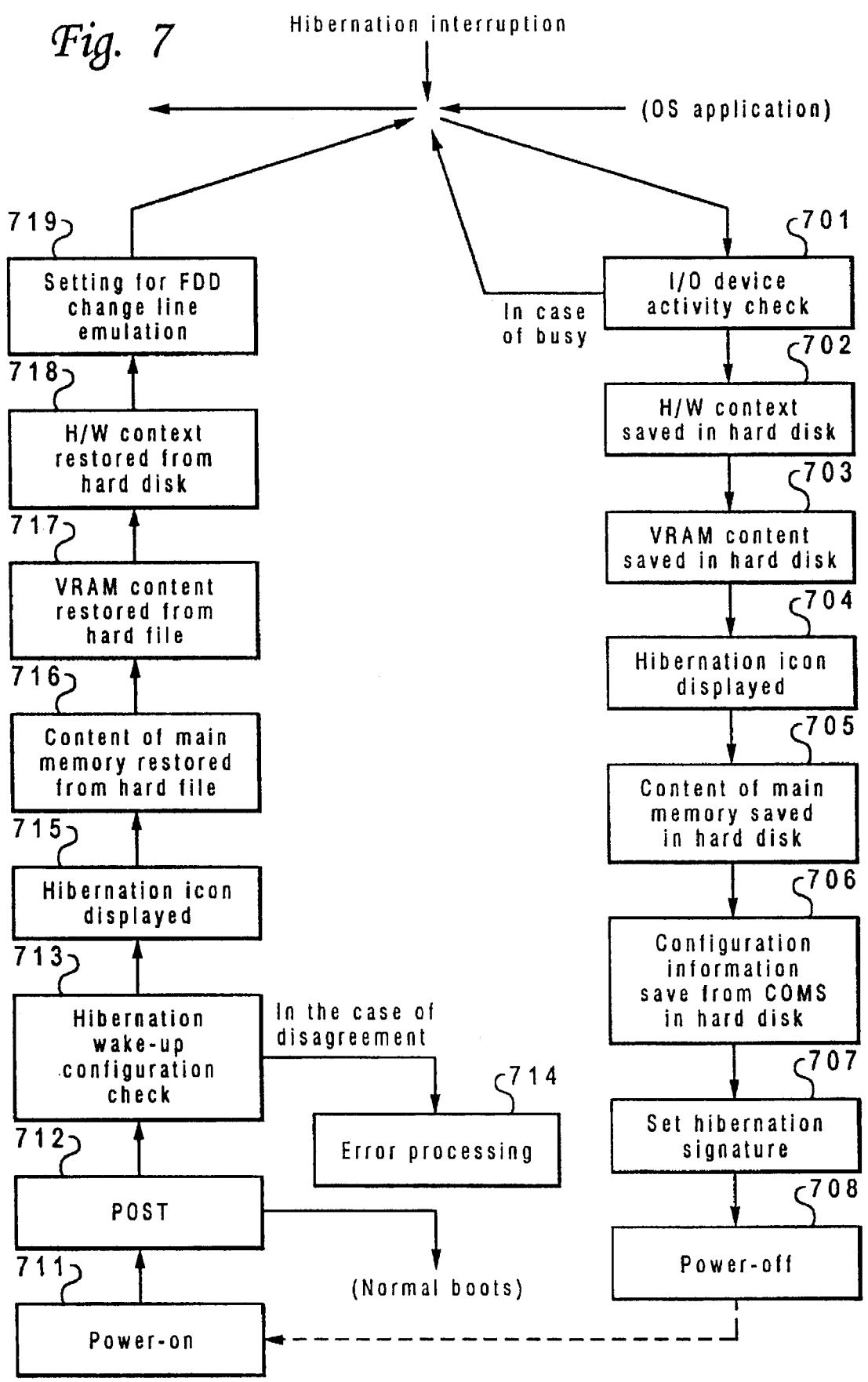
FIG. 7 is a flowchart generally showing a sequence of hibernation/wake-up process.

Referring to FIG. 7, an outline will be explained with respect to the store/restore sequence in entering or exiting the hibernation mode. The processing from step 701, shown in the drawings, up to step 708, as well as the processing from step 713 up to step 719, will be performed when the main CPU executes the PMC of the PM memory.

At the outset, a store/sequence will be described. As shown in FIG. 1, when the sub-CPU 40 detects the occurrence of a predetermined situation (for example, a hot key has been pressed or the system is placed in a low battery state), a trap logic 16 transmits a system interruption signal to the main CPU 10. This triggers the suspension of a task that is currently executing, and the control of the system operation is shifted from the OS file system or an application to the PMC (a trap handler).

When the PMC analyzes the cause of the system interruption and determines that an external phenomenon, imparted through a signal line 50, is responsible for the system interruption, the PMC jumps to the store operation execution routine so as to enter hibernation mode.

At the outset, the PMC checks for the presence of activity in the I/O device (step 701). When activity is present (for example, DMA is executed), the activity check is repeated after a predetermined time has elapsed (for example, 10 msec) until the I/O activity is no longer detected.

When the I/O activity is not detected, the PMC saves hardware context information in the PM memory. In the next step, the system saves the whole work data, including the hardware context information, from the PM memory to the hard disk device (step 702). A typical hardware context information includes register values of each chip such as a CPU, an interruption controller, a DMA controller, a video controller, and count values of a timer.

In step 703, the PMC transfers original data of the VRAM to the hard disk device. At this time, data of the VRAM may be compressed for storage on a hard disk. In step 704, an icon image is written in the VRAM to be displayed in a display device indicating that the saving operation is effected for hibernation.

The PMC transfers original data of the main memory to the hard disk device while displaying an icon (step 705). At this time, data in the main memory may be compressed for storage on the hard disk. In step 706, system configuration information is saved from the CMOS to the hard disk device. A typical example of system configuration information includes the type and number of optional devices connected to the main body of the system (portable computer) and the size of the main memory.

In step 707, the PMC sets the hibernation signature, indicating that the above sequence has been completed. The hibernation signature is two bytes of information, which is one item of control information stored in area A shown in FIG. 3.

Finally the PMC sends a command to the sub-CPU to power off the system (step 708).

Next, the restoration sequence will be explained. When the system is powered-on, the main CPU executes the POST (power-on self-test) program stored in the ROM (step 712). The POST performs the following operation. When the system configuration is modified, such as an increase in the memory during the power-off or the modification in the number of the FDD, the POST detects such modification and directly or indirectly rewrites the system configuration information of the CMOS by using the set-up program. As an operation related with the FDD, the system checks as to whether or not the FDD/FDC normally operates, such that the system needs to be booted from the FDD prior to the hibernation wake-up, and FDD is removed and another unit or device is attached. The PMC is transferred from the ROM to the PM memory. The hibernation signature is then checked.

When the system needs to be booted from the FDD, or when the system is powered off, but not via steps 701 through 708, the system enters into a procedure for normal boot without the transfer of the control rights over to the system operation to the PMC. When a hardware error is detected such as the absence of normal operation of the FDD/FDC, the system stops.

In this way, in accordance with the present invention, personal history information, as to whether or not the system has passed the hibernation sequence, is retained in the hard disk device without retaining it in other elements in the system. During POR, the POST utilizes the personal history information in the hard disk device to determine whether a hibernation wake-up or a normal boot is effected. Consequently, a removable hard disk device is carried to enable the task with other machines provided with the function identical to the machine which performs the storing operation to be resumed. In other words, a frozen system environment can be freely moved.

When the presence of the hibernation signature, namely the hibernation context, is confirmed, the control over the system moves from the POST to the PMC. At the outset, the PMC compares the hard disk with the system configuration information of the CMOS (step 713). When a disagreement between the hard disk and the system configuration system is detected, an error message is displayed with an icon or the like to prompt the system to allow users to select either of the following operations: to invalidate the current hibernation signature or to restore the system configuration before modification by powering-off the system (step 714). Moreover, when the restoration of the system configuration is chosen, the system configuration prior to the modification is proposed to guide users.

When the hard disk device is removable, there is a great possibility that an environment when data is saved in a hard disk (first environment) is different from the environment when the system is in a wake-up state (second environment). For example, in some cases, the size of the main memory may be smaller in the second environment. Furthermore, where an application was running which demands that the base address of the I/O device be a specific value, the specific address may not be obtainable in the second environment. Furthermore, if an application was executed which accesses a floppy disk in the first environment, problems exist when there is no floppy disk drive in the second environment. In such cases, various disadvantages are produced; wake-up itself becomes impossible, the resumed task destroys data, etc. Thus, the function of checking the system configuration is important.

When it is confirmed that the environment allows the wake-up function, the PMC writes an icon image informing that the PMC is being restored (wake-up) onto the VRAM to be displayed on the display device (step 715). The PMC, while displaying a hibernation icon, restores the original data of the main memory from the hard disk (step 716). Later, the icon is erased and the original data of the VRAM is restored from the hard disk (step 717). In step 718, work data, including hardware context information, is restored in the PM memory. Then, hardware, such as an I/O device and the CPU register thereof, is restored to an address. In the final step, the PMC sets the FDD change line emulation (step 719). After the above sequence, the control of the system is shifted to the OS file system and an application. After the point of interruption, task execution is resumed.

E. Details of Saving/Restoring Operation to the Hibernation File

The operation of saving data into the hibernation file (PM_HIBER. BIN) (steps 702, 703, 704, 705, 706, and 707) will be more specifically detailed in conjunction with FIG. 8.

At the outset, the PMC stores hardware context information in the PMC region of the memory (step 801). Thus, if the hardware context information is saved at the outset, the hardware context information can be modified to facilitate the later saving operation.

In step 802, a master boot record (MBR) of the hard disk is accessed to obtain partition information (start address and size of each partition) of the hard disk device. The MBR is a cylinder which is defined at the outermost region of the hard disk. The cylinder is reserved and cannot be accessed by users.

In step 803, the PMC obtains an address of the root directory of each partition except for a partition smaller than a predetermined value. Since the address calculation method is common knowledge, details are not given here. For example, when DOS serves as the OS file system, the BIOS parameter block (BPB) located at the front of the partition is referred to in order to calculate an address of the root directory of the partition.

In step 804, a directory where the address is calculated is sequentially accessed to search for the name of the file (PM_HIBER.BIN). If PM_HIBER.BIN is not detected in any of the directories, the execution of the hibernation file is rejected and the users are notified of the rejection by means of a beep or a display of a message of the rejection.

Figure 9:
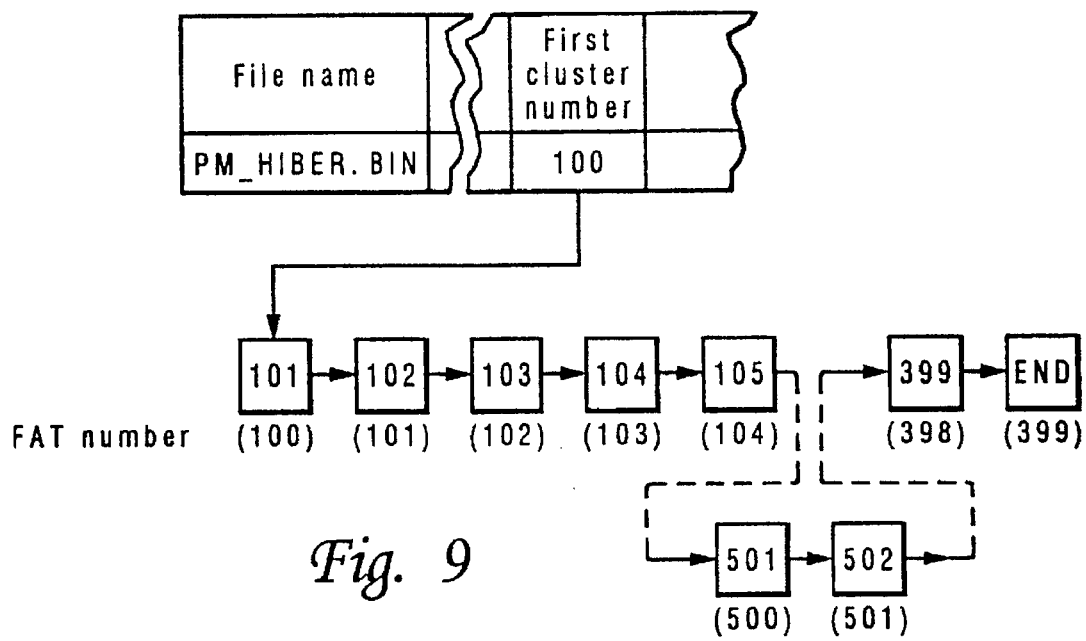
FIG. 9 is a view illustrating a file allocation list on a hard disk.

When PM_HIBER.BIN is detected, the file allocation list is tracked (step 805). FIG. 9 shows as an example a case in which DOS is given as the OS file system. The file allocation given when four sectors are defined as one cluster is divided into a sector block which begins from cluster 100 and continues up to cluster 149, a sector block which begins from cluster 500 and continues up to cluster 549, and a sector which begins from cluster 300 and continues up to cluster 399. The entry of PM_HIBER.BIN in the root directory describes the first cluster number 100. As is already known, the FAT (file allocation table) is provided in each cluster on the basis of a 1:1 ratio. The FAT describes the subsequent cluster number (namely FAT number) or a special number designating the last of the file. In step 805, the PMC accesses the hard disk one or more times thereby tracking 200 FAT list.

Figure 10:
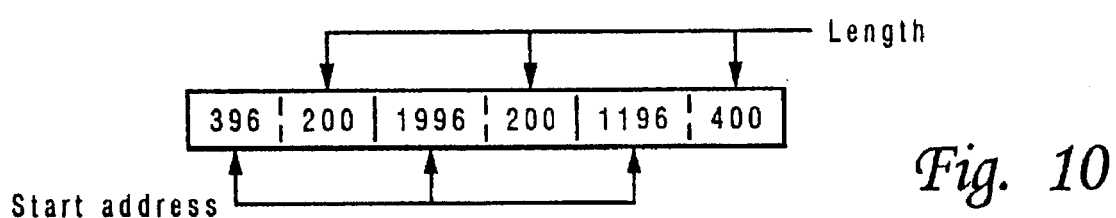
FIG. 10 is a view showing file allocation information after conversion.

The file allocation information obtained in this way is converted into unique allocation information suitable for the store/restoration in step 806. FIG. 10 shows the formatting of information after the above conversion. The illustrated example corresponds to FIG. 9. The PMC generates an 8-byte long piece of data in which a front sector address (relative address from the sector address physically in front of the address) and the length (sector number) is recorded. The allocation information after conversion is temporarily buffered in the work data area of the PMC memory.

Referring again to FIG. 8, in step 807 the PMC checks whether or not the file size of PM_HIBER.BIN can support the total size of the work data of the currently mounted VRAM, main memory, and the PM memory. For example, when the main memory is increased after the hibernation file is generated, not all the data can be saved. Then, when the file size is not sufficient, the system rejects the execution of the hibernation, and the user is notified by means of a beep or the like.

When the file size is sufficiently large, the allocation information generated at step 806 itself is used to save the allocation information from the PMC to the hibernation file (step 808). Later, work data, the contents of VRAM, and the contents of the main memory are each saved in the hibernation file (steps 809 through 811). When transferring the data to the hard disk, the file allocation information in the PMC memory is referred to.

Lastly, the control information is prepared so as to save it in the control information area (area A in FIG. 3) (steps 812 and 813). The control information items include start addresses for blocks B, C and D respectively, shown in FIG. 3, the current system configuration information located in the CMOS, and the hibernation signature. The system configuration information includes the base I/O address of the device, the size of the main memory, and the device configuration (type and number of devices). The base I/O address indicates that which of the two the base address is used (3F8 (H) or 2F8 (H), for example) with respect to each device connected to the serial port.

Figure 11:
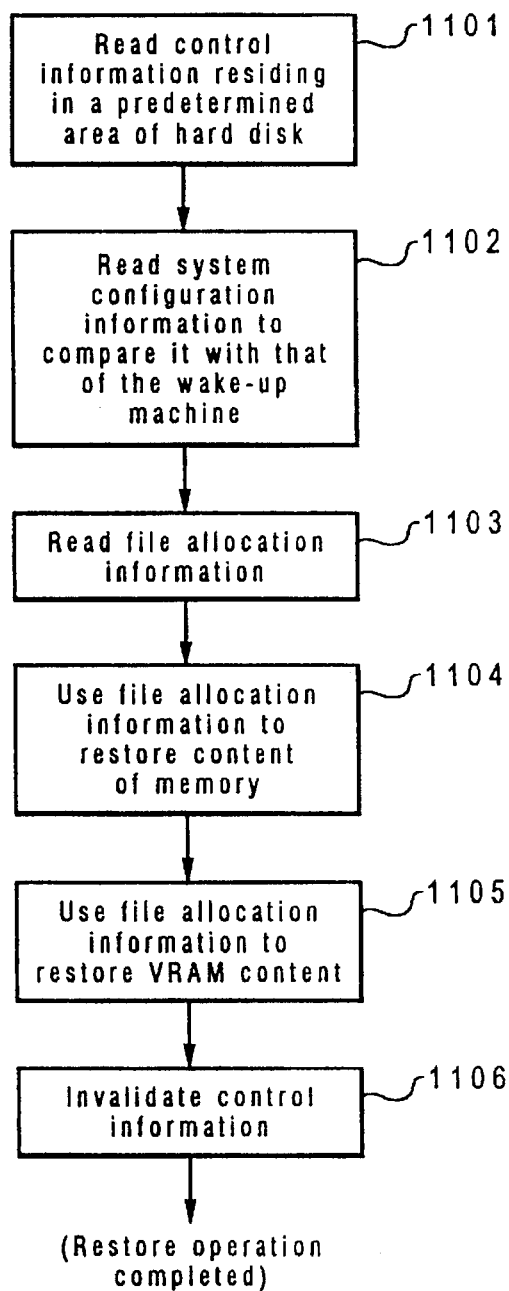
FIG. 11 is a flowchart showing a restoration operation procedure from a hibernation file.

Next, referring to FIG. 11, the data restoration operation from the hibernation file (PM_HIBER.BIN) (steps 713, 716 and 717) will be more specifically described.

At the outset, the PMC accesses the control information area of the CE cylinder to read the control information located there in order to determine the position of the hibernation file on the hard disk (step 1101). Since the address in the control information area is fixed, the address can be immediately accessed. In step 1102, the system configuration information included in the control information is compared with the system configuration information in CMOS of the wake-up machine.

In step 1103, the PMC uses the start address included in the control information to access the file allocation information block on the hard disk so as to restore the file allocation information in the PMC. The PMC uses the file allocation information to restore the contents of the main memory at the outset and then to restore the contents of the VRAM (steps 1104 and 1105). In these steps, the main memory block included in the control information area and the start address of the VRAM block are utilized. Lastly, the control information on the hard disk is invalidated so as to complete the restoration operation (step 1106). Since the hibernation signature is also invalidated, the power-on operation boots the system by the normal procedure as long as the system does not enter hibernation mode.

Figure 8:
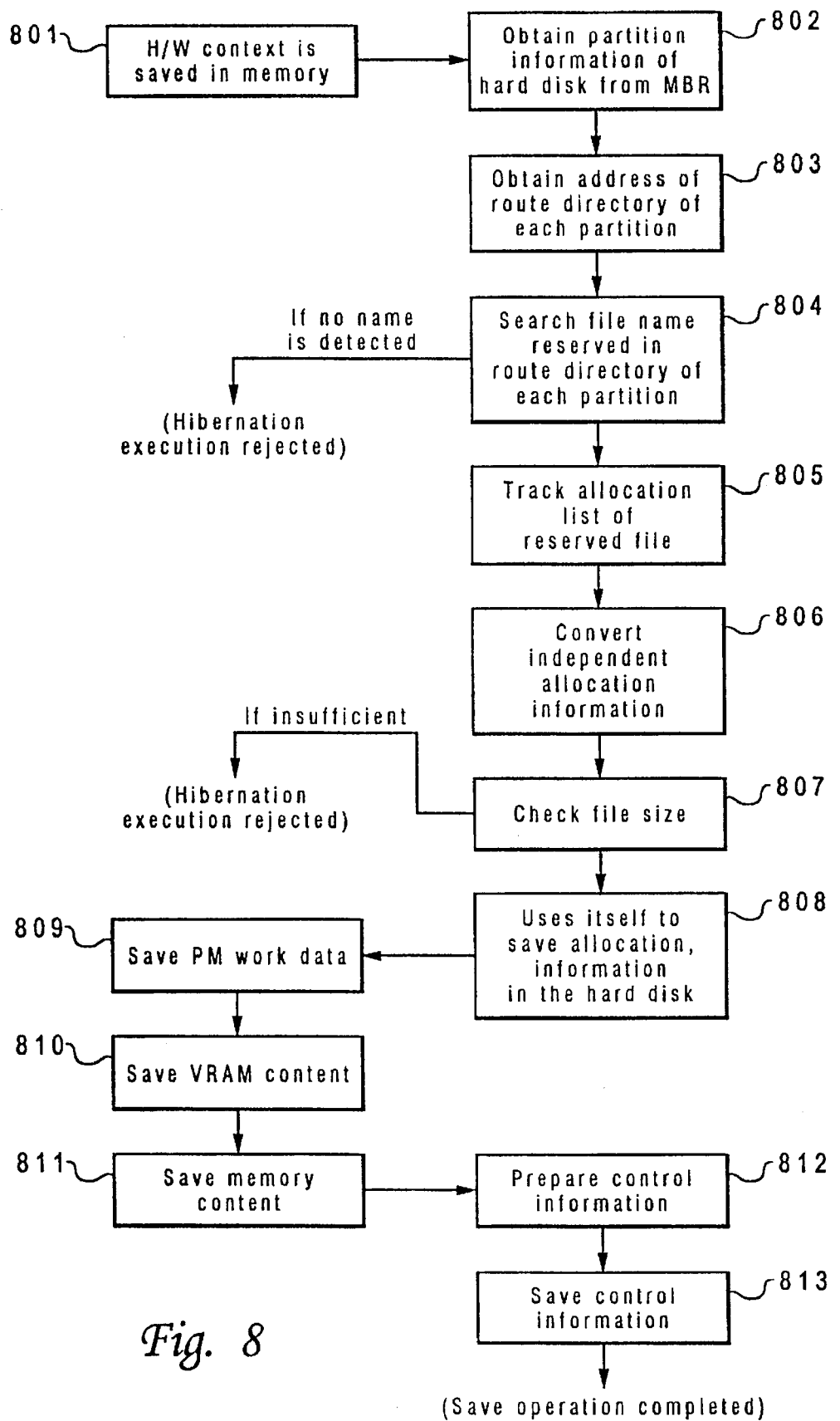
FIG. 8 is a flowchart generally showing a saving operation procedure of the hibernation file.

Furthermore, there is a step, not shown, exhibiting a hibernation icon between steps 810 and 811 of FIG. 8 and between steps 1103 and 1104 of FIG. 11. Attention should be paid to the fact that there is a step, not shown, for restoring H/W context information between steps 1105 and 1106 of FIG. 11.

The position information of sectors constituting a hibernation file on the hard disk is managed by the OS file system in the form of a complex list. Therefore, in accordance with the present invention, before the data transfer to the hibernation file is initiated, the complex list managed by the OS file system or the driver is accessed so as to obtain the position information of these sectors, thereby converting the position information into its independent allocation information and inputting the information into the buffer (PM memory). Then, when data is transferred from the VRAM and the memory to the hard disk device, its independent information is exclusively referred to determine the sector position of the file. Consequently, when data is transferred to the hard disk, the file allocation information area, such as the FAT area, on the hard disk may not be accessed, thereby enabling acceleration of the saving operation.

Furthermore, in accordance with the present invention, allocation information on an independent hibernation file, prepared in executing the saving operation, is written on part of the hibernation file. At the same time, the start address thereof is written on a block located on a fixed address on the hard disk. When data is transferred from the hard disk device to the VRAM and the memory, the allocation information stored in the file is referred to so as to determine the position of the sectors constituting the file. Consequently, when data is transferred from the hard disk device, the file space allocation information areas such as the FAT area, on the hard disk need not be accessed. Thus, upon wake-up, the frequency of access to the hard disk for obtaining the allocation information of the hibernation file can be minimized, thereby enabling acceleration of the restoration operation.

F. Icon Display Operation

Figure 12:
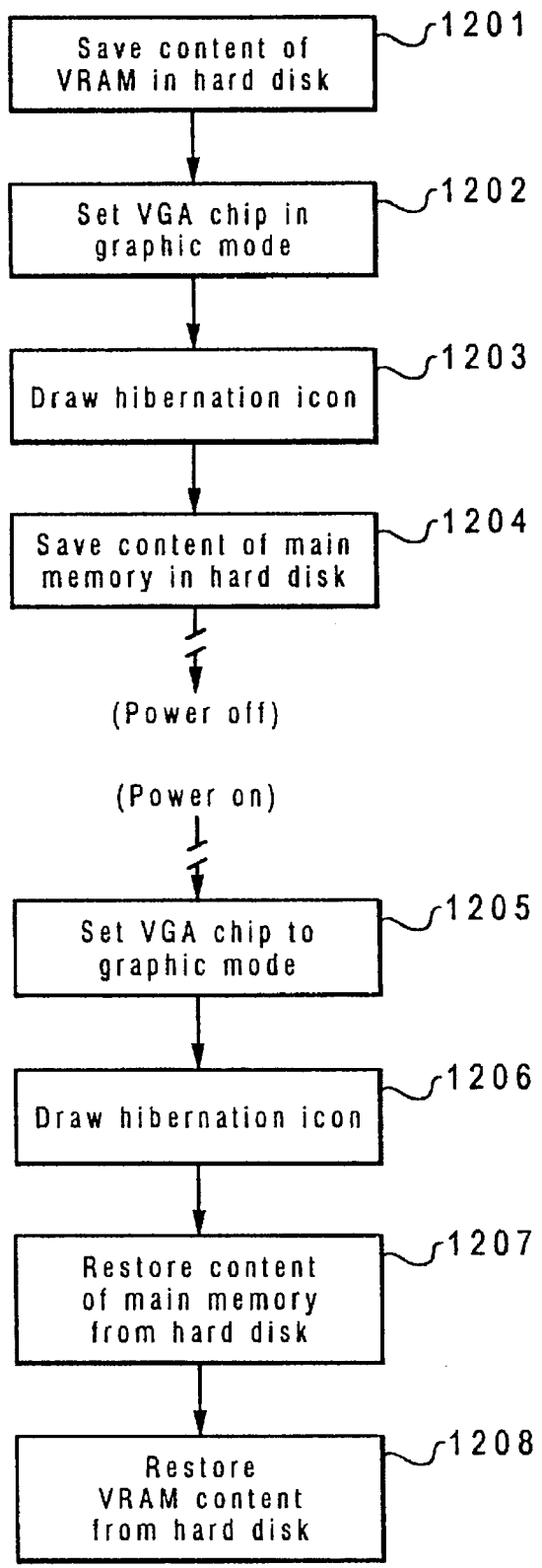
FIG. 12 is a flowchart showing an operation procedure relating to the hibernation icon display.

Referring to FIG. 12, an operation related with the icon display (steps 703 through 705 and steps 715 through 717) will be described in more detail.

In accordance with the present invention, the content of the main memory and the content of the VRAM are divided for the management thereof. When the system enters into hibernation mode, the PMC saves the content of the VRAM on the hibernation file (step 1201). After the original data is saved, a VGA chip (video controller) is set to a graphics mode and the icon image is written on the VRAM to display the image on a display device connected with the main body of the system (steps 1203 and 1204). While data is transferred from the main memory to the hard disk, the icon continues to be displayed.

Upon wake-up, a VGA chip is set to a graphics mode and the icon image is written on the VRAM to display the image on a display device (steps 1205 and 1206). While data is transferred from the hard disk to the main memory, the icon continues to be displayed (step 1207). The original data of the VRAM is restored thereafter (step 1208).

While the VRAM is being accessed (steps 1203 and 1208), the icon is not displayed. However, the amount of time the VRAM is being accessed is sufficiently short compared with the amount of time the main memory is accessed (steps 1204 and 1208). In steps 1203 and 1208, the amount of time the icon is not displayed is just such a moment and has poses no practical disadvantage.

Figure 13:
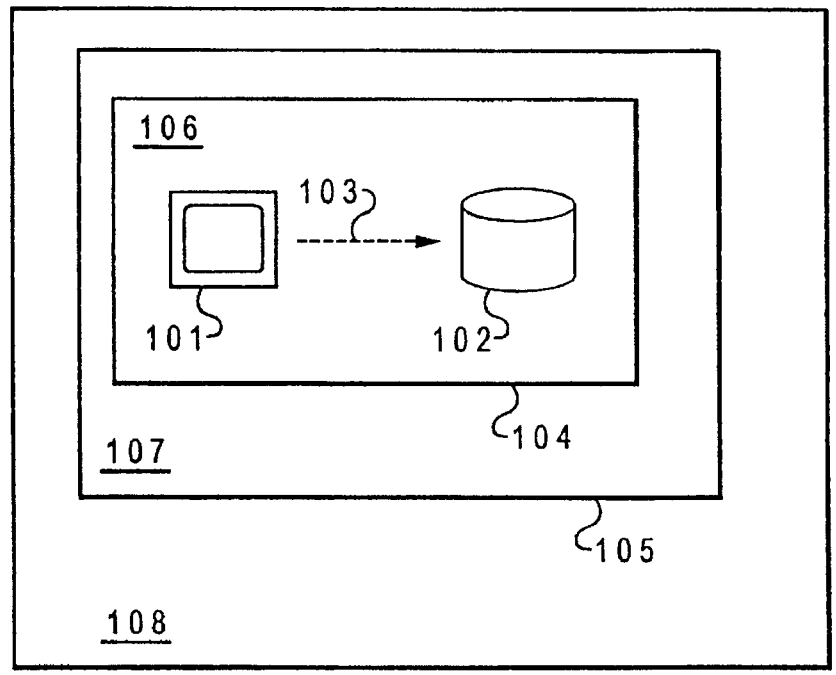
FIG. 13 is a view showing a screen including a hibernation icon.

FIG. 13 shows one example of a screen shown at step 1203. Icon 101 designates a system icon 102 a hard disk device, and icon 103 the direction of data transfer. These icons are surrounded by icon frames 104 and 105. The color of area 106 inside of icon frame 104 and the color of area 107 are different from the background 108.

Figure 14:
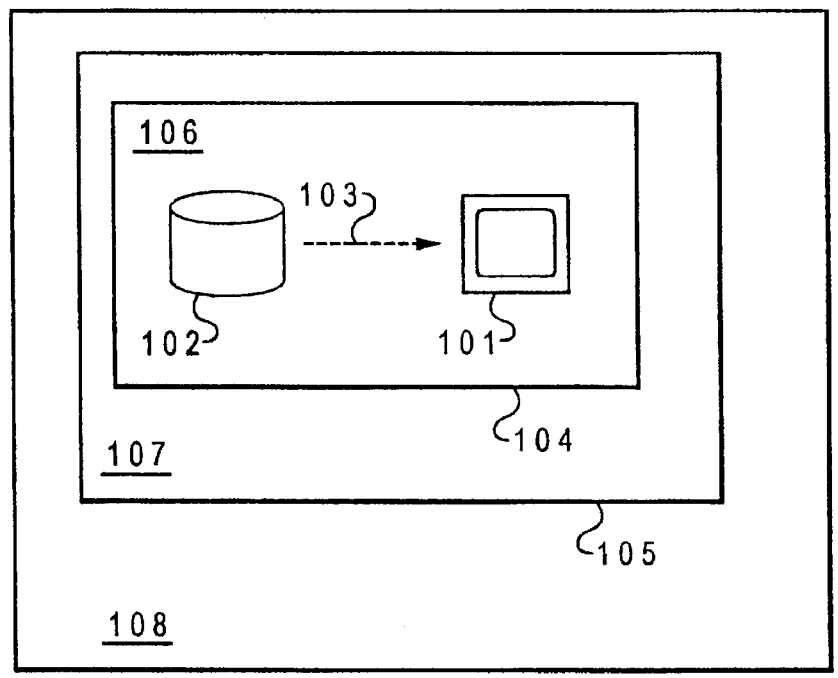
FIG. 14 is a view illustrating a screen including a hibernation icon.

FIG. 14 shows one example of a screen shown at step 1208 of FIG. 12. The design of this example is the same as the counterpart of FIG. 13 except that the position of icons 101 and 102 have been changed.

Figure 15:
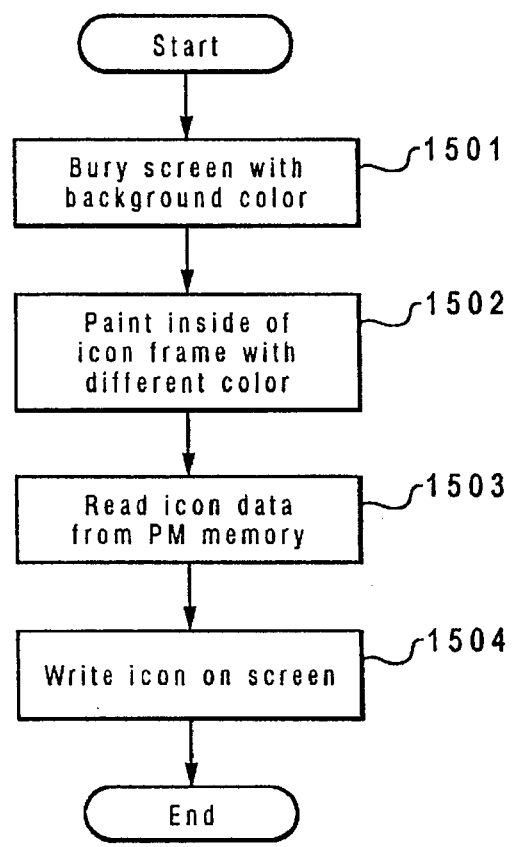
FIG. 15 is a flowchart showing in detail the display operation of the hibernation icon.

Referring to FIG. 15, the icon drawing step common in steps 1203 and 1206 of FIG. 12 is specifically explained. At the outset, the PMC sets the background color over the whole VRAM to bury the screen with the background color (step 1501). Then, the PMC paints the areas 106 and 107 inside of the icon frame with a different color from the background (step 1502). As shown in FIGS. 13 and 14, areas 106 and 107 are simple squares so that the program (PMC) designates the position thereof on the screen to paint the inside very easily. In steps 1503 and 1504, the image data of the icons 101, 102, and 103 are read from the PM memory so as to set them on the VRAM. Since icon images are small in data quantity, the images are stored in the ROM in advance so that they are written on the PM memory at the time of POR.

The hibernation icon may be a static image. However, when data is transferred between the hard disk and the main memory, the VRAM is regularly accessed to rewrite the content so as to change the hibernation icon along with the time (for example, blinking an arrow icon 103 or adding an image showing the quantity of saved/restored data in the system icon 101).

In this way, in accordance with the present invention, the block of the main memory and the block of the VRAM data are divided for management. When the system enters into hibernation mode, the original data of the VRAM is stored at the outset. Later, the original data of the main memory is stored. Furthermore, when the system is in the wake-up state, the original data of the main memory is restored before the original data of the VRAM is restored. The access procedure to the VRAM and the access to the main memory is different whether it is the saving operation or the restoring operation.

Suppose the main memory and the block of the VRAM data are not divided for the management. When the contents of the VRAM are saved before the main memory is saved, the contents of the VRAM must be restored prior to the contents of the main memory. Consequently, when the system enters into hibernation mode, an icon cannot be displayed at the time of wake-up, even if an icon is displayed. Conversely, if the contents of the main memory are saved first and then the contents of the VRAM, an icon cannot be displayed upon entering hibernation mode.

Consequently, to display icons without destroying the original data in the VRAM when entering hibernation mode and at wake-up, it is essential to change the sequence of access to the VRAM and main memory from the time of saving operation to the time of restoring operation by dividing the block of the main memory data and the block of the VRAM as proposed in the specification of the present application.

G. FDD Change Line Emulation

Figure 16:
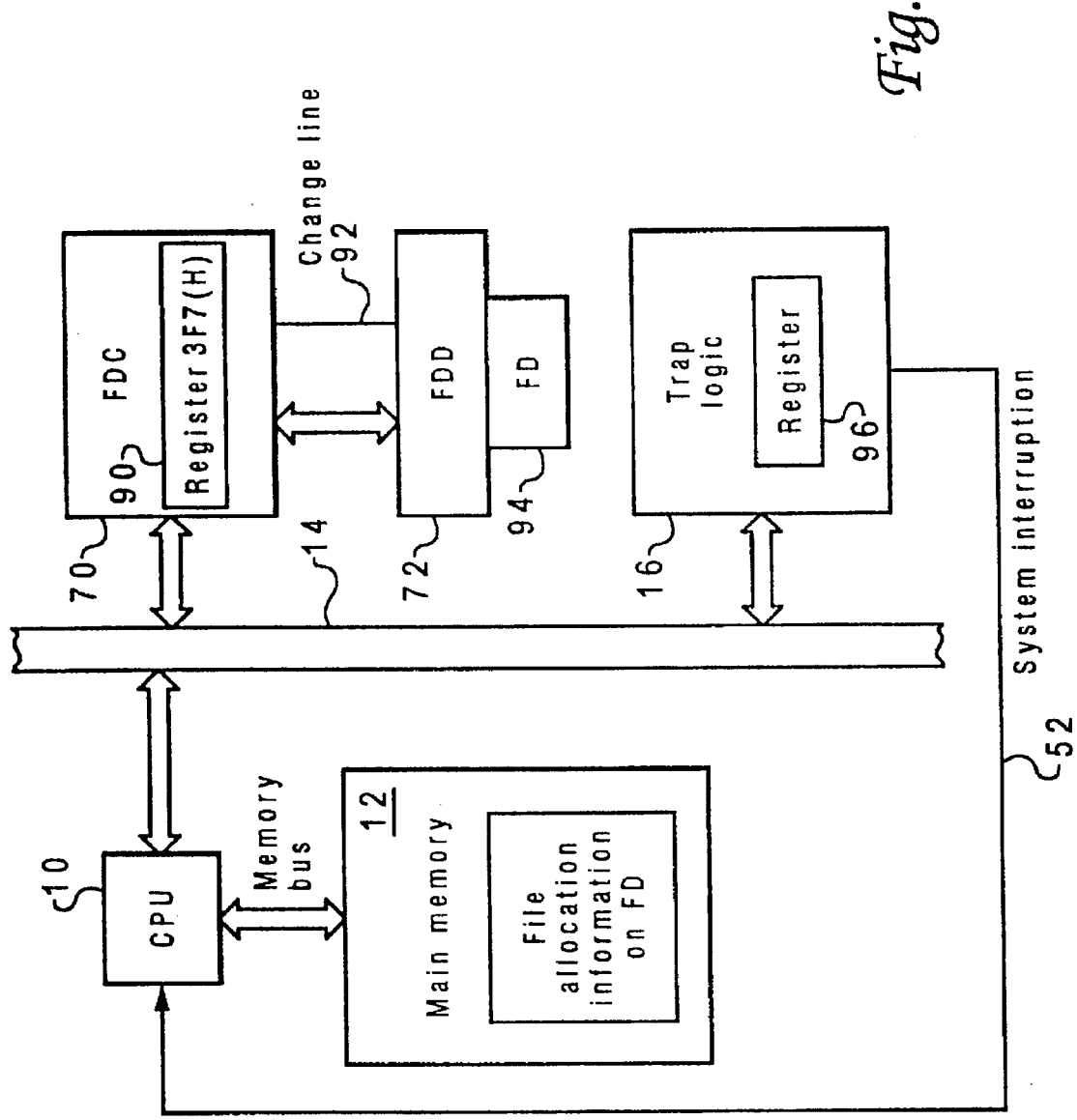
FIG. 16 is a view showing a hardware element relating to the FDD change line emulation.
Figure 22:
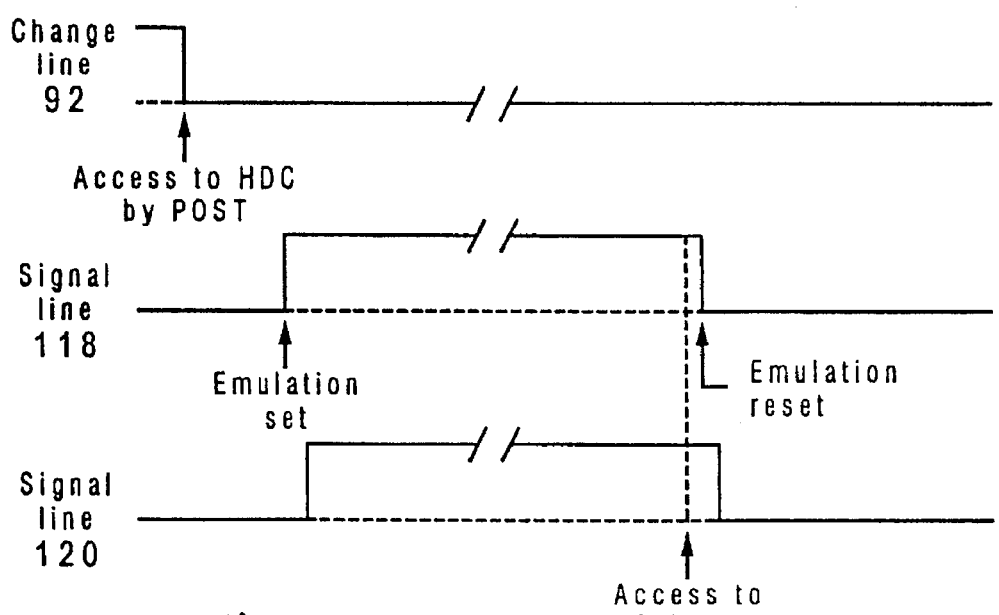
FIG. 22 is a waveform view related with an embodiment of the invention.

Referring to FIGS. 16 and 22, an FDD change emulation will be explained which is supported by the PMC.

FIG. 16 is a view showing a hardware element relating to an FDD change line emulation extracted from FIG. 1. Elements not shown in FIG. 1 include an FD (floppy disk) 94 mounted in an FDD, a change line 92 between the FDD and an FDC, a change line status register 90 in the FDC, and a trap register 96 storing an address that should be monitored in the trap logic.

A method for accessing the FD normally differs depending upon whether the FD has been accessed or not in the past. When the FD has been accessed (read/written) in the past, the file allocation information (FAT when DOS serves as OS file system) read at that time is saved in a predetermined memory address managed by the OS file system. Consequently, it is not necessary to read the allocation information from the FD. In this way, access to the FD from the second time onward is accelerated.

The following mechanism generally determines whether or not the allocation information on the FD in the main memory is valid. The change line connecting the FDD to the FDC is a signal line used exclusively for monitoring the attachment of the FD on the FDD and the detachment thereof. When the system is powered on, the change line is automatically activated. Then POST accesses the FDD through the FDC to detect the presence of the FD, and the change line automatically becomes inactive. When the FD is not detected, the change line remains active. In addition, when an FD is inserted, the change line becomes active. When the inserted FD is actually accessed, the change line automatically becomes inactive. When the FD is ejected, the change line becomes active again. In the embodiment, the high state corresponds to an active state whereas the low state corresponds to an inactive state.

The flag reflects the status of the change line. The bit 7 of the change line status register (register 90 in FIG. 16), to which an I/O address 3F7 (H) is allocated, is a flag (change line status flag) at that time. The bit 7 shows that the change line is active when the value assumes 1, whereas it shows that the change line is inactive when the value assumes 0.

The BIOS or the driver directly access the FDC (for example, BIOS when DOS serves as the OS file system, and the driver when OS/2 serves as the OS file system). The BIOS/driver reads the content of the change line status register, and when the bit line 7 assumes 1, the allocation information on the FD in the main memory is invalidated (flashed) and reads the new file allocation information on the FD.

So, when the system enters hibernation mode, the FD is inserted in the FDD. In addition, when the FD has already been accessed, the file allocation information of the FD is saved on the hard disk and is restored in the memory when the system is woken up.

If the FD is exchanged in hibernation mode, the POST detects that the FD resides in the FDD. When the wake-up sequence is finished, the change line signal has become inactive. Consequently, the BIOS/driver has a disadvantage because it believes the restored file allocation information on the old FD to be valid and uses that information to access the FD currently inserted in the FDD and reads mistaken data, thereby destroying the data on the FD. There is also a possibility that similar problems will arise in the case of resumption after suspension.

Problems accompanying the exchange of media in suspension or hibernation also exist in card-type memory media (such as SSF). However, in the case of such media, well furnished software has been prepared. Such software may be used to solve the problem. In those systems when the system enters into a low-power consumption mode with the card mounted on the system. When the system leaves this mode, the software fakes the system so as to appear as if the card has been detached at the time of entering the low-power consumption mode. On the other hand, when the software is resumed or woken up, it fakes the system so as to appear as if the card has been mounted. With such deception, the system invalidates the file allocation information on the card in the main memory and obtains new allocation information. In this way, when entering and exiting low power consumption mode, the software performs a fake operation on the system with the software so as to cut-off electricity to the cards.

However, in the case of the FD, a method is established in which the status of the status change line signal varies with a predetermined timing in terms of hardware, with the status being read by the CPU. While harmonizing such an established method to solve the above problem resulting from the exchange of an FD that has been executed in a low power consumption mode, a different means has to be taken from that used for the card-type memory medium.

Therefore, the present invention fakes the status when the BIOS/driver checks the change line status flag for the first time after waking up or after finishing the sequence. Thus even if an FD is inserted into the FDD, the software fakes the system so as to appear as if the FD has been removed from the FDD, thereby flashing the file allocation information on the FD. Specifically, there are two methods that can be used. One method is where an access to the change line status register is trapped so as to temporarily fake a value of the change line status flag. Another method is where a board is prepared which allows the operation of a change line signal through hardware.

Each of the above methods will be explained with respect to the case of a wake-up generated from the hibernation mode. However, note that the present invention can be applied to a system which is resuming operation after the suspend mode.

The most recent portable computers provide a mechanism that traps I/O access. Such a mechanism can be realized by a combination of Intel's 80486SL(CPU) and 82360SL(trap logic). When the I/O address is set in the register (register 96 in FIG. 16) in 82360SL, 82360SL issues a system interruption to the system when 80486SL issues an instruction to access the I/O address. In response to the system interruption, the handler (PMC) is enabled. When it has been determined that the system interruption has been caused by an access to a predetermined I/O address after analyzing the cause of the interruption, the system jumps to the trap routine.

Conventionally, the trap mechanism has been used to power-on a device that has been powered-off when a command is issued to access the device before accessing the device. A first method for faking the change line status is to use the trap mechanism.

Figure 17:
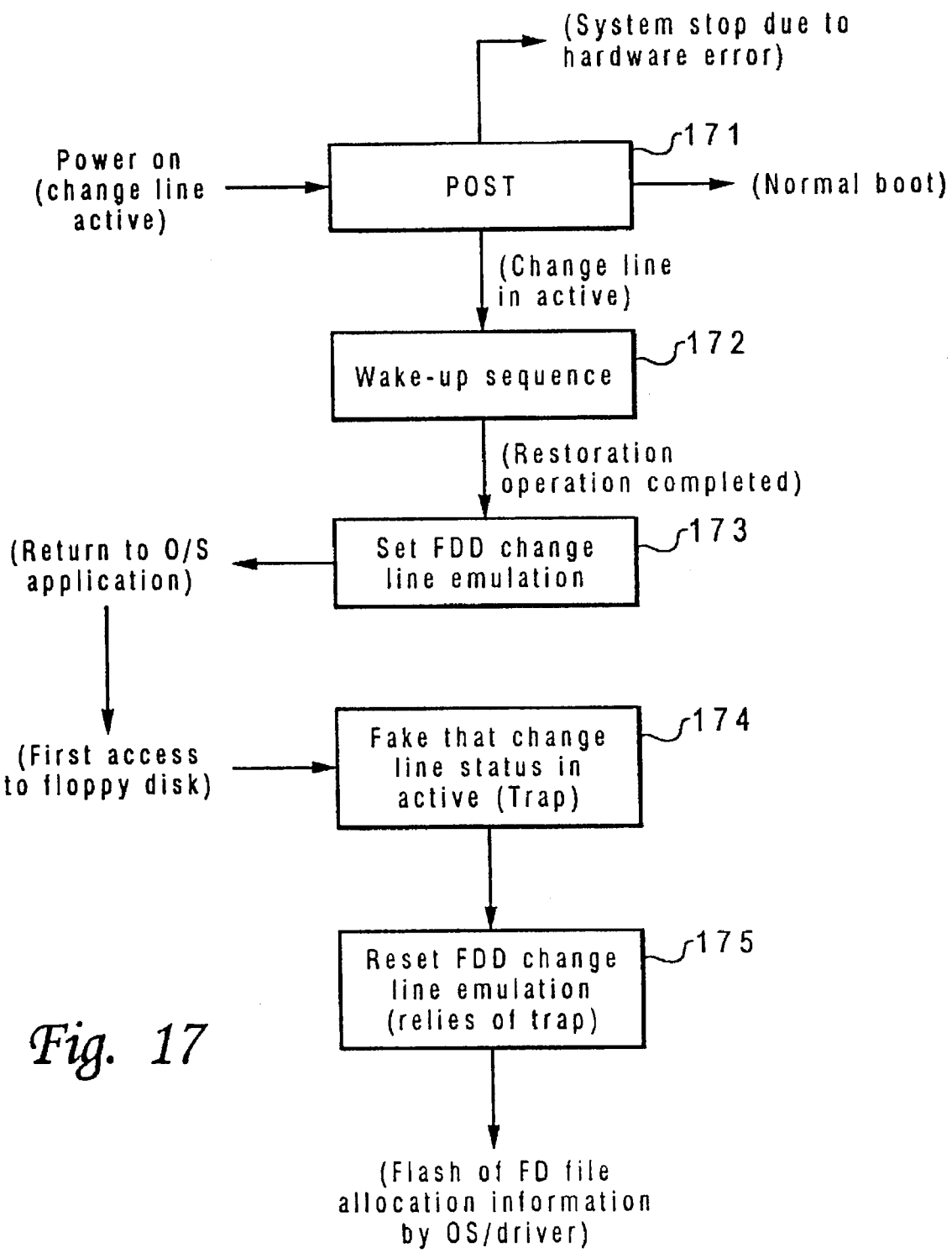
FIG. 17 is a flowchart showing the step included in the first method of the FDD change line emulation.

Referring to FIG. 17, the flow of steps relating to the fake operation will be detailed below. As has already been mentioned, once POST, which runs after power-on, confirms the hibernation signature, the system enters the wakeup sequence (steps 171, 172). The change line status is active at power-on. However, when the POST detects that the FD remains inserted in the FDD, the system becomes inactive.

In step 173, the PMC sets the system to a status ready for the change line emulation. Specifically, register 96 of the trap logic 16 is set to the value of 3F7 (H) (see FIG. 16). After this step, the control of the system returns to the OS/application.

When the FD is accessed for the first time after resuming the OS/application execution, the fake of the change line status is performed (step 174). Step 174 will be further explained with reference to FIGS. 18 and 19.

Figures 18, 19:
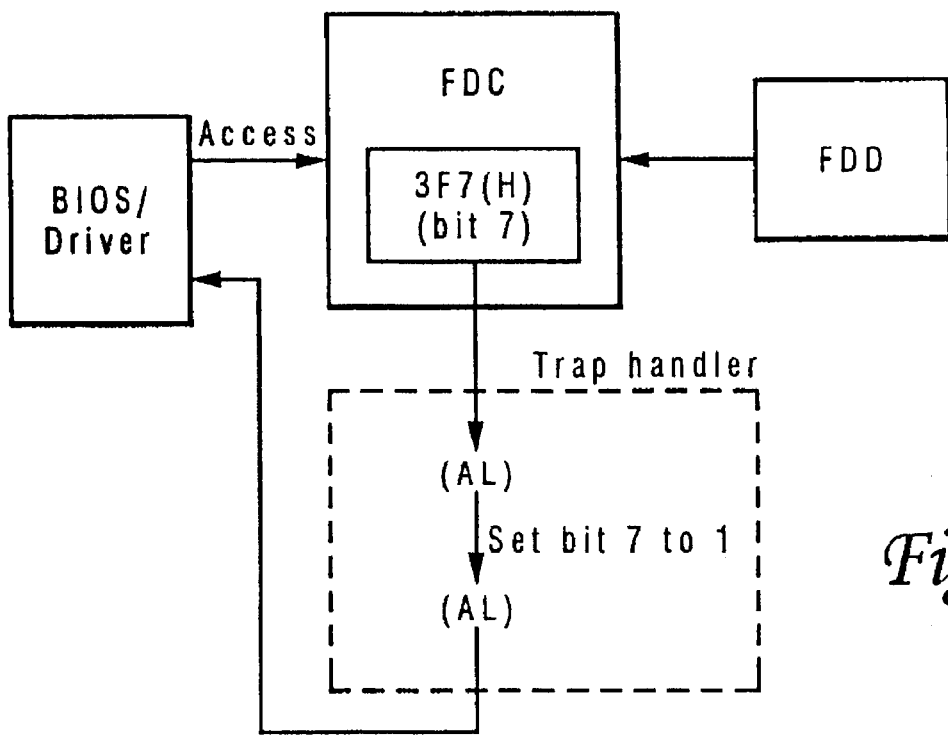
FIG. 18 is a view illustrating the traps of I/O access in an embodiment of the invention.
FIG. 19 is a view illustrating the relationship between the code and the trap in the BIOS/driver.

FIG. 19 shows part of the code of the BIOS/driver. When the command MOV DX, 3F7 (H) is executed, the DX register of the CPU loads 3F7 (H). Then when the command IN AL, DX is executed, I/O address 3F7 (H) is accessed so as to allow the AL register in the CPU to store the content of the change line status register. At this time, the system interruption is executed so as to perform the trap handler (PMC). The handler analyzes the cause of the system interruption thereby jumping to a routine to execute the trap of access to I/O address 3F7 (H). The routine sets a value of bit 7 in the AL register to 1 and brings it back to the BIOS/driver. Consequently, in the subsequent command TEST AL, 80H conveys to the BIOS/driver information that the value of bit 7 is set to 1. In response to this, the OS/driver flashes file allocation information in the FD into the memory. Then, to access a desired file on the FD, the system reads allocation information in the FD.

The PMC clears a value set in a trap register before returning to the BIOS/driver (step 175 of FIG. 17). Consequently, after the first time, the change line status is not faked during access to the FD.

Figure 20:
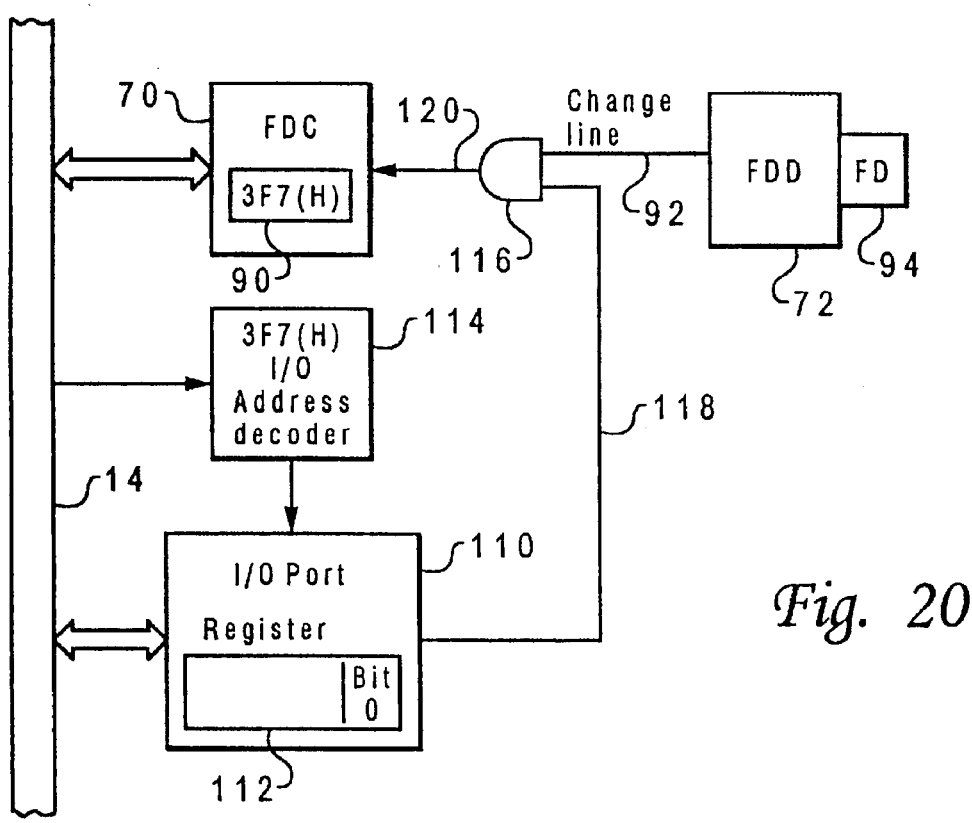
FIG. 20 is a view showing a hardware element for realizing an embodiment of the invention of FDD change line emulation.

The second method is realized by adding a hardware element to the board as shown in FIG. 20. The added elements are an I/O port 110 incorporating a register 112, an I/O address decoder 114, an OR gate 116, and signal lines 118 and 120. A specific I/O address (1500 (H)) is allocated to the register 112. A signal showing a specific bit value (bit 0) of the register 112 is inputted to one input terminal of the OR gate 116 via a signal line 118. The change line signal is inputted from FDD 72 to the other input terminal of OR gate 116. The output terminal of the OR gate 116 is connected with bit 7 of the change line status register 90. The output of the OR gate 116 becomes a bit 7 value of register 90. The I/O address decoder 114 monitors the address bus 14 to decode the address signal 3F7 (H), thereby outputting a pulse signal to the I/O port 110 when it is detected. The output terminal of the decoder 114 is connected to the clear terminal of the register 112.

Figure 21:
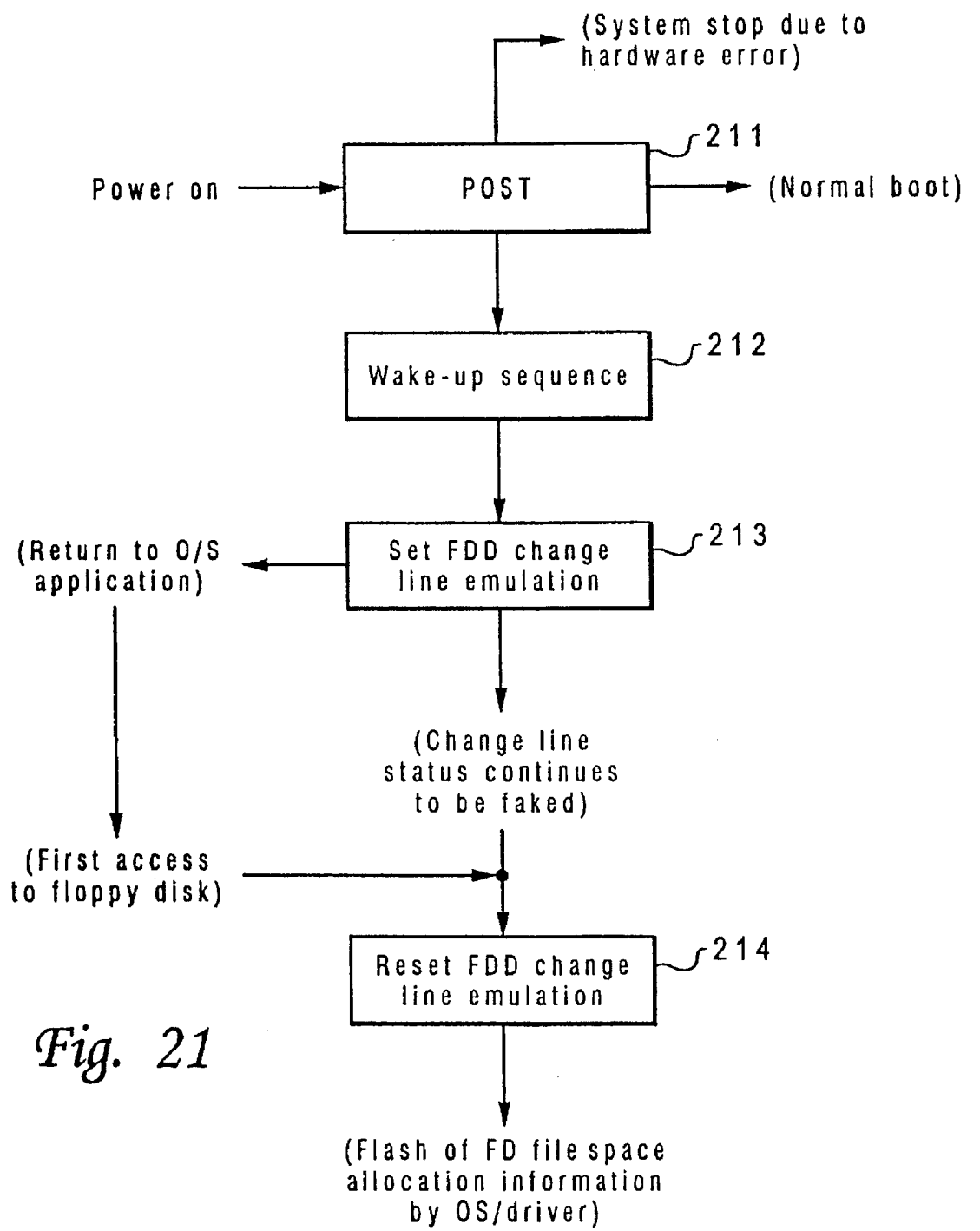
FIG. 21 is a flowchart showing steps included in an embodiment of the invention.

Referring to FIG. 21, the step flow of method 2 will be described. Steps 211 and 212 are the same as steps 171 and 172 of FIG. 17. In step 213, to set the FDD change line emulation, the PMC commands I/O address 1500 (H) are indicated, thereby/setting bit 0 to 1. As a consequence, as shown in FIG. 22, the change line status remains inactive to access FDC with POST. However, since the signal line 118 becomes active, the status of the signal line 120 becomes active. Consequently, bit 7 of the change line status register 90 is set to 1.

After step 213, the control of the system returns to the OS/application. While the OS/application is executed, the value of bit 7 in register 90 remains at 1 and the fake status of the change line status continues.

When the BIOS/driver reads the I/O address 3F7 (H) during the initial access to the FD after resuming OS/application, the value of bit 7 becomes 1. Thus, the OS/driver flashes file allocation information of the FD.

During an access cycle to the address 3F7 (H), a pulse is generated from the decoder 114 which clears the register 112. Thus, both inputs to the OR gate 116 become inactive.

Some systems do not have a trap mechanism. Even when some systems do have a trap mechanism, the performance of the trap mechanism is restricted. In such cases, the second method is effective.

While the invention has been particularly shown and described with reference to a preferred embodiment, it will be understood by those skilled in the art that various changes in form and detail may be made therein without departing from the spirit and scope of the invention.

What is claimed is:

1. In an information processing system including a CPU, a main memory, a floppy disk controller (FDC), and a floppy disk drive (FDD), a change line being provided between said FDC and said FDD for monitoring attachment/detachment of a floppy disk to/from said FDD, the status of said change line being reflected by a flag value in a status register in said FDC, the flag status being used to determine the validity of the file allocation information that has been stored via said FDC to said main memory, said information processing system comprising:

a means for entering a low power-consumption mode by turning off the power to said FDC and FDD upon the occurrence of a first predetermined condition;

a means for entering a normal operation mode, during which said FDC and FDD are powered-on, upon the occurrence of a second predetermined condition; and a means for protecting said floppy disk at the first access after the transition from said low power-consumption mode to said normal operation mode, regardless of whether said floppy disk was in said FDD when said low power-consumption mode was entered, by asserting that said floppy disk has been removed.

2. An information system according to claim 1 wherein said means for protecting said floppy disk comprises:

trap logic for monitoring access to an I/O address set in a stored register;

a means for setting an I/O address in said trap logic register to show said status register;

a means for rewriting said flag value when said access to said status register is trapped a first time by said trap logic upon return to said normal operation mode; and a means for clearing the trap logic register so that access to said status register after the first time is not trapped.

3. An information system according to claim 1 wherein said means for protecting said floppy disk comprises:

a register to which a specific I/O address is allocated;

a logic gate in which one input is connected to said change line, another input is connected to a specific bit of the register, and an output of said logic gate is supplied to said status register;

a means for setting, in the process of returning to the normal operation mode, said specific bit in said register so that the flag value in said status register is set to indicate that the file allocation information is invalid; and a means for clearing said register of said specific I/O address in response to said status register.

4. An information system according to claim 1 wherein said low-power consumption mode is a hibernation mode in which said main memory is powered-off.

5. An information system according to claim 1 wherein said low-power consumption mode is a suspend mode in which said main memory is powered-on.

6. A method for causing new file information to be accessed from an alternate memory store during wake-up of a portable computer system, said method comprising the steps of:

trapping an I/O access;

issuing a system interrupt when an I/O address of a change line is trapped;

setting a flag active if said system interrupt is caused by a first access to said change line;

getting file allocation information from said alternate memory store and storing said file allocation information if said flag is active.

7. A method for causing new file allocation information to be accessed from a diskette during wake-up of a system, comprising the steps of:

monitoring an address bus for an address of a change line;

outputting a pulse signal when said address of said change line is detected on said address bus, even if said diskette has not been removed;

in response to receipt of said pulse signal, setting a bit in an I/O port register to an active state; activating a signal line when said bit in said I/O port register is in said active state;

setting a flag associated with said change line to an active state;

reading new file allocation information from said diskette into a short term memory and outputting a reset pulse when accessing said change line while said bit is set to said active state in said I/O port register; and deactivating said signal line when said reset pulse is received.

* * * * *